(12) United States Patent
Chen

(10) Patent No.: US 12,349,770 B2
(45) Date of Patent: Jul. 8, 2025

(54) BELT BUCKLE ASSEMBLY AND WEIGHTLIFTING BELT

(71) Applicant: ANHUI CHAMPION INTELLIGENT MANUFACTURING TECHNOLOGY CO., LTD, Hefei (CN)

(72) Inventor: Zhidong Chen, Hefei (CN)

(73) Assignee: Anhui Champion Intelligent Manufacturing Technology Co., Ltd, Hefei (CN)

( * ) Notice: Subject to any disclaimer, the term of this patent is extended or adjusted under 35 U.S.C. 154(b) by 0 days.

(21) Appl. No.: 18/293,277

(22) PCT Filed: Sep. 5, 2022

(86) PCT No.: PCT/CN2022/116980
§ 371 (c)(1),
(2) Date: Jan. 29, 2024

(87) PCT Pub. No.: WO2023/030515
PCT Pub. Date: Mar. 9, 2023

(65) Prior Publication Data
US 2025/0089856 A1    Mar. 20, 2025

(30) Foreign Application Priority Data

Sep. 4, 2021  (CN) .......................... 202122124931.0
Aug. 26, 2022 (CN) .......................... 202222270613.X

(51) Int. Cl.
A44B 11/06       (2006.01)
A63B 21/00       (2006.01)
(Continued)

(52) U.S. Cl.
CPC ...... *A44B 11/065* (2013.01); *A63B 21/00181* (2013.01); *A41F 9/025* (2013.01); *B60P 7/083* (2013.01)

(58) Field of Classification Search
CPC . A41F 9/025; A41F 9/002; A41F 9/02; A63B 21/00181; B65H 75/4418;
(Continued)

(56) References Cited

U.S. PATENT DOCUMENTS 4,170,329 A    10/1979  Takada
5,647,824 A     7/1997  Levenson
(Continued)

FOREIGN PATENT DOCUMENTS

CN    210076633 U    2/2020
CN    215958513 U    3/2022

OTHER PUBLICATIONS

International Search Report dated Nov. 30, 2022 for International Application No. PCT / CN2022/116980.

*Primary Examiner* — Jason W San
*Assistant Examiner* — Michael S Lee

(57) ABSTRACT

The present invention discloses a belt buckle assembly and a weightlifting belt, and belongs to the technical field of belts. The belt buckle assembly according to the present invention comprises a belt buckle base plate, a pin shaft member, a ratchet wheel and a handle ratchet which fit each other, and a swing handle housing, wherein the swing handle housing is rotatably mounted on the belt buckle base plate through the pin shaft member; the handle ratchet is rotatably supported and mounted on the swing handle housing; the ratchet wheel is provided with a center hole and is sleeved on the pin shaft member through the center hole; and the ratchet wheel is provided with an unlocking slot. The belt buckle assembly further comprises a ratchet wheel unlocking mechanism, wherein the ratchet wheel unlocking mecha-
(Continued)

nism comprises an unlocking assembly, which can move axially or radially along the pin shaft member.

16 Claims, 6 Drawing Sheets

(51) Int. Cl.
  *A41F 9/02* (2006.01)
  *B60P 7/08* (2006.01)
(58) Field of Classification Search
  CPC ............ B65H 75/4428; B65H 75/4492; B65H 75/4431; A61F 5/028; B60P 7/0823; B60P 7/0838; B60P 7/083; A44B 11/065; A44B 11/125; Y10T 24/1416; Y10T 24/1482
  See application file for complete search history.

(56) References Cited

U.S. PATENT DOCUMENTS

| | | | |
|---|---|---|---|
| 9,155,359 B1 | 10/2015 | Bailey | |
| 2018/0154862 A1* | 6/2018 | Wedeking | F16H 31/002 |
| 2018/0334075 A1* | 11/2018 | Frank | A61B 17/1327 |
| 2019/0186595 A1* | 6/2019 | Agarwalla | F16G 3/006 |
| 2020/0269397 A1 | 8/2020 | Shih | |
| 2021/0122287 A1* | 4/2021 | Mollick | F16G 11/12 |
| 2022/0304425 A1* | 9/2022 | Hurley | A44B 11/02 |

* cited by examiner

BELT BUCKLE ASSEMBLY AND WEIGHTLIFTING BELT

TECHNICAL FIELD

The present invention relates to the technical field of belts, and in particular, to a belt buckle assembly and a weightlifting belt.

BACKGROUND

A weightlifting belt, also known as a weightlifting leather belt, is a thick leather belt for protecting waist and back, and is used in squats, standing presses, deadlifts, or the like. It is one of the bodybuilding terms. The weightlifting belt is a protective tool designed to protect waist muscles and soft tissues from injury. Since weightlifting sometimes involves lifting weights heavier than a body weight of a user, the user needs to protect the waist from injury while maximizing a strength potential of the user, so as to use all strength to lift the barbell.

The existing weightlifting belt has a relatively conventional structural design, and is not convenient enough in the tightness adjustment. Therefore, the applicant has proposed Chinese utility model patent with Publication No. CN210076633U on Feb. 18, 2020 and entitled "CONVENIENTLY ADJUSTABLE WEIGHTLIFTING BELT" to solve the above problems. However, the applicant found after development and production that this weightlifting belt has an overly complex structure, low production efficiency, and poor overall appearance; in addition, this weightlifting belt has some defects in the structural design, and consequently, this structure is not ergonomic, and the operation and the adjustment are not convenient enough.

SUMMARY

1. Technical Problems to Be Resolved in the Present Invention

The present invention provides a belt buckle assembly, which aims to solve the problem of inconvenient unlocking and adjustment structure of the existing belt buckle assembly.

The present invention further provides a weightlifting belt, and the tightness adjustment of the weightlifting belt in use can be conveniently performed by using the belt buckle assembly.

2. Technical Solutions

In order to achieve the objective, the present invention provides the following technical solutions.

A belt buckle assembly provided by the present invention comprises a belt buckle base plate, a pin shaft member, a ratchet wheel and a handle ratchet which fit each other, and a swing handle housing, wherein the swing handle housing is rotatably mounted on the belt buckle base plate through the pin shaft member, the handle ratchet is rotatably supported and mounted on the swing handle housing, the ratchet wheel is provided with a center hole and sleeved on the pin shaft member through the center hole, and the ratchet wheel is provided with an unlocking slot;

the belt buckle assembly further comprises a ratchet wheel unlocking mechanism; wherein the ratchet wheel unlocking mechanism comprises an unlocking member, and the unlocking member can move radially along the pin shaft member so as to be engaged into or disengaged from the unlocking slot, or the ratchet wheel unlocking mechanism comprises a limiting sleeve, and the limiting sleeve can move axially along the pin shaft member so as to be engaged into or disengaged from the unlocking slot; and the structure of the ratchet wheel unlocking mechanism is arranged such that when the unlocking assembly is engaged into the unlocking slot of the ratchet wheel, the pin shaft member can rotate together with the ratchet wheel, and when the unlocking assembly is disengaged from the unlocking slot of the ratchet wheel, the pin shaft member can rotate individually.

Furthermore, the ratchet wheel unlocking mechanism uses a button assembly, the button assembly comprising the limiting sleeve; and the limiting sleeve is movably sleeved with the ratchet wheel, and a plurality of convex parts fitting the unlocking slots are distributed at an inner side end of the limiting sleeve.

Furthermore, the button assembly further comprises a button and a button nut, a button stud extends from an inner end of the button, the button stud movably passes through a center hole of an end face of the limiting sleeve and is connected to the button nut in a threaded fit manner, and the convex parts are distributed on an outer circumferential wall of an upper end of the limiting sleeve.

Furthermore, sleeve rib parts are distributed and arranged on an inner wall of the limiting sleeve, and axial guide grooves fitting the sleeve rib parts are distributed and arranged on an outer wall of a short shaft.

Furthermore, a lower end face of the pin shaft member is provided with a button spring groove, a button spring is arranged in the button spring groove, and a lower end of the button spring is connected against an upper end face of the button assembly.

Furthermore, the ratchet wheel unlocking mechanism uses the unlocking member, and the unlocking member is mounted in an unlocking hole formed in a peripheral surface of the pin shaft member and radially moves along the pin shaft member.

Furthermore, the ratchet wheel unlocking mechanism further comprises a button assembly; the pin shaft member is provided with a button hole along an axial direction, and the unlocking hole formed on the peripheral surface of the pin shaft member is communicated with the button hole; and the button assembly is arranged in the button hole and can drive the unlocking member to protrude and retract to complete an unlocking action.

Furthermore, the button assembly comprises a locking part and a releasing part axially arranged in sections; the button assembly axially moves along the button hole, and outer peripheral surfaces of the locking part and the releasing part of the button assembly can be separately in contact fit with the unlocking member; when the outer peripheral surface of the locking part of the button assembly is in contact fit with the unlocking part, the unlocking part protrudes out of a surface of the unlocking hole of the pin shaft part, so that the ratchet wheel is locked; and when the outer peripheral surface of the releasing part of the button assembly is in contact fit with the unlocking member, the unlocking member is completely positioned in the unlocking hole of the pin shaft member, so that the ratchet wheel is unlocked.

Furthermore, a button is mounted at an outer end of the button assembly, and the button protrudes out of an end face of the pin shaft member.

Furthermore, an elastic member that presses an inner end of the unlocking member is arranged in the button hole of the pin shaft member.

Furthermore, the unlocking member has a spherical shape.

Furthermore, the outer peripheral surface of the locking part of the button assembly has an arc-shaped surface matched with a spherical surface of the unlocking member.

Furthermore, a maximum distance that the unlocking member extends out of the unlocking hole is less than a radius of the spherical unlocking member.

Furthermore, the pin shaft member is provided with a plurality of unlocking holes at intervals along an outer peripheral surface, one unlocking member is mounted in each unlocking hole, and the ratchet wheel is provided with an unlocking slot corresponding to the unlocking hole.

Furthermore, a pair of handle lug plate housings that rotatably fit at two ends of the pin shaft member extend from an end part of the swing handle housing, a pair of base lug plate housings extend from a front surface of the belt buckle base plate, and the pin shaft member is rotatably mounted in the base lug plate housing through a shaft sleeve.

Furthermore, a tooth end of the handle ratchet is embedded into a ratchet wheel tooth groove of the ratchet wheel, one side that is of the handle ratchet and that is far away from the ratchet wheel is provided with a handle ratchet spring groove, one end and the other end of the handle ratchet spring abut against the handle ratchet spring groove and an inner wall of the handle lug plate housing respectively, and the handle ratchet spring is rotatably mounted in the handle lug plate housing through a handle ratchet shaft.

Furthermore, the belt buckle assembly further comprises a seat plate ratchet, wherein the seat plate ratchet is rotatably mounted in the base lug plate housing below through a seat plate ratchet shaft.

Furthermore, a tooth end of the seat plate ratchet is also embedded into the ratchet wheel tooth groove of the ratchet wheel, an outer side wall of the seat plate ratchet is provided with a seat plate ratchet spring groove, a seat plate ratchet spring is arranged in the seat plate ratchet spring groove, and the other end of the seat plate ratchet spring is connected against an inner wall of the base lug plate housing.

Furthermore, a base side edge plate for positioning a side edge of the belt extends from a side edge of the belt buckle base plate, and the base side edge plate is provided with a plurality of holes.

Furthermore, one side that is of the belt buckle base plate and that is far away from the swing handle housing is provided with a plurality of seat plate rivet bosses passing through the belt, and rivets for pressing and fixing the belt are mounted on the seat plate rivet bosses in a fitting manner.

Furthermore, one side that is of the swing handle housing and that is close to the belt is provided with a plurality of grooves, and a shape of the grooves is adapted to a shape of human fingers.

The present invention further provides a weightlifting belt, which comprises a belt buckle assembly for winding a connection band, a belt body, a connection band mounting seat and the connection band, wherein the belt buckle assembly is fixed at an end part of the belt body, the connection band mounting seat is fixed at the other end of the belt body, and the connection band is fixedly connected to the connection band mounting seat.

Furthermore, a band seat groove cavity is arranged at a back side of the connection band mounting seat, a plurality of band seat rivet bosses for passing through the belt body are distributed and extended in the band seat groove cavity, rivets for pressing and fixing the belt body are also mounted on the band seat rivet bosses in a fitting manner, a band body through slot communicated with the band seat groove cavity is further provided at a side end of the connection band mounting seat, and an end part of the connection band passes through and is fixed in the band body through slot.

3. Beneficial Effects

Compared with the existing well-known technology, the used technical solutions provided by the present invention have the following beneficial effects.

The present invention has a reasonable structural design, and the structural design of the belt buckle assembly is relatively simple, so that the assembly is more convenient, and the production and manufacturing efficiency is favorably improved; most parts are hidden inside, so that the overall appearance and shape are better; in addition, this structural design is more ergonomic and is more convenient to operate and adjust, and meanwhile, through the radial and axial movement of an unlocking member under the pushing of the button, the ratchet wheel and the pin shaft member can be locked or unlocked conveniently, so that the use is convenient.

Figure 1:
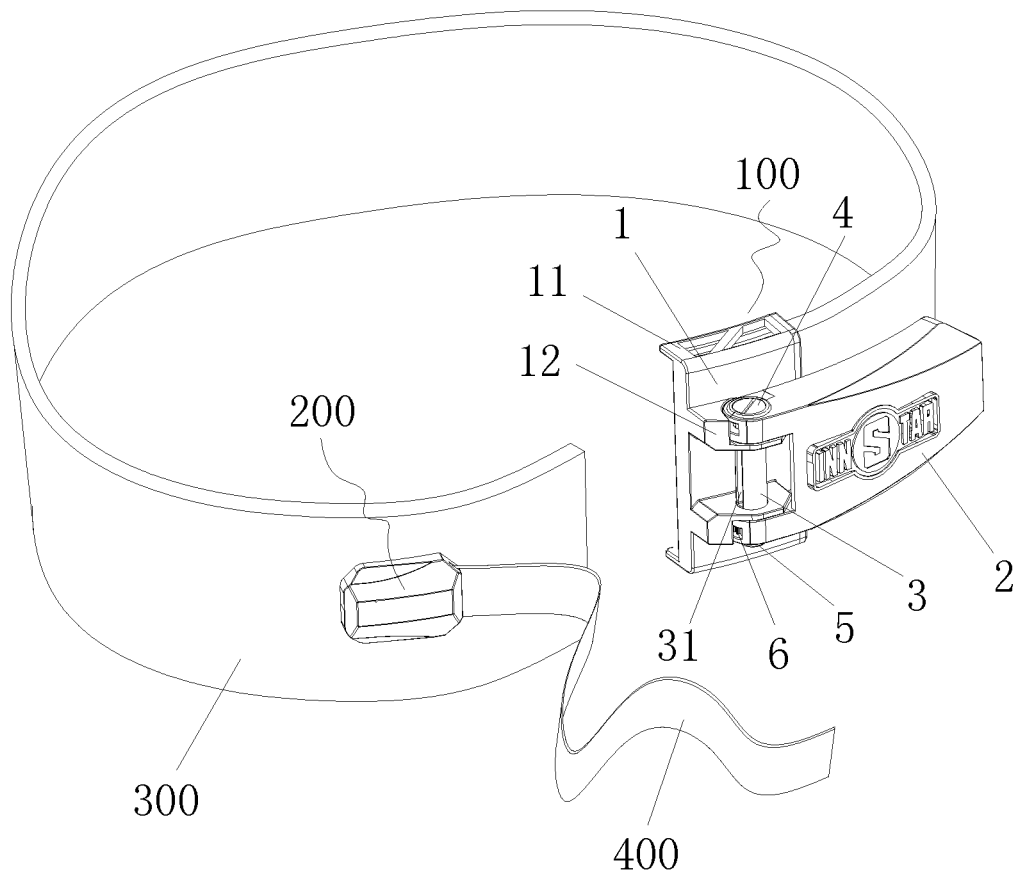
FIG. 1 is a schematic diagram of an overall structure of a belt according to the present invention.

The reference numerals in the drawings are indicated as follows:

100: belt buckle assembly; 200: connection band mounting seat; 201: band seat groove cavity; 202: band seat rivet boss; 203: band body through slot; 300: belt body; 400: connection band; 1: belt buckle base plate; 11: base side edge plate; 12: base lug plate housing; 121: pawl mounting seat; 122: thin wall portion; 13: seat plate rivet boss; 2: swing handle housing; 21: handle lug plate housing; 211: lug plate; 22: groove; 3: pin shaft member; 31: band body through hole; 32: short shaft; 33: shaft sleeve; 34: button spring groove; 35: unlocking member; 4: end part pin; 5: button assembly; 51: button nut; 52: limiting sleeve; 53: convex part; 54: sleeve rib part; 55: connecting part; 56: locking part, 57: releasing part, 58: transition arc-shaped surface; 6: ratchet wheel; 61: unlocking slot; 7: handle ratchet; 71: handle ratchet spring groove; 72: handle ratchet shaft; 8: seat plate ratchet; and 81: seat plate ratchet shaft.

DETAILED DESCRIPTION OF EMBODIMENTS

The following detailed description of exemplary embodiments of the present invention refers to the accompanying drawings, which form a part of the description. Exemplary embodiments in which the present invention can be implemented are shown by way of example in the accompanying drawings, wherein elements and features of the present invention are identified by reference numerals. The following more detailed description of the embodiments of the present invention is not intended to limit the scope of the present invention as claimed, but is presented for purposes of illustration only and is not limited to the description of the features and characteristics of the present invention, to set forth the best mode of implementing the present invention, and to sufficiently enable those skilled in the art to practice the present invention.

Embodiment 1

This embodiment provides a weightlifting belt, as shown in FIG. 1, which comprises a belt body 300, a connection band mounting seat 200, a connection band 400, and a belt buckle assembly 100 for winding the connection band 400, wherein the connection band mounting seat 200 is fixedly mounted on an outer wall of a left end of the belt body 300, the connection band 400 is fixedly connected to the connection band mounting seat 200, the connection band 400 provided on the connection band mounting seat 200 passes through the band body through hole 31 formed on the pin shaft member 3, and the swing handle housing 2 rotates to tighten and lock the connection band 400. According to the weightlifting belt in this embodiment, a user rotates the swing handle housing 2 to drive the pin shaft member 3 to rotate, and the connection band 400 is wound on the pin shaft member 3, thereby tightening the belt body 300.

Figure 9:
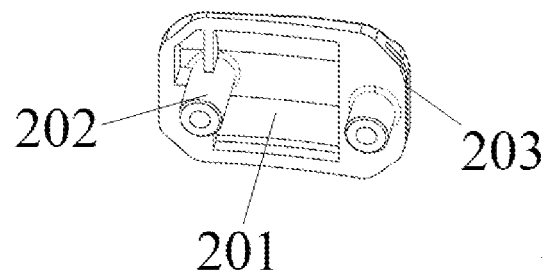
FIG. 9 is a schematic diagram of a three-dimensional structure of a back side of a connection band mounting seat in the belt according to the present invention.

Further, with reference to FIG. 9, a band seat groove cavity 201 is arranged at a back side of the connection band mounting seat 200, a plurality of band seat rivet bosses 202 for passing through the belt body 300 are distributed and extended in the band seat groove cavity 201, and rivets for pressing and fixing the belt body 300 are also mounted on the band seat rivet bosses 202 in a fitting manner, so that the assembly and manufacture of the connection band mounting seat 200 and the belt body 300 are convenient. A band body through slot 203 communicated with the band seat groove cavity 201 is further provided at a side end of the connection band mounting seat 200, and an end part of the connection band 400 passes through and is fixed in the band body through slot 203. In this embodiment, after the end part of the connection band 400 passes through the band body through slot 203, the end part can be sewn and fixed with the connection band 400, or the connection band 400 can be folded into a folded part with a thickness much larger than a thickness of the band body through slot 203, so that the connection band 400 cannot be pulled out from the band body through slot 203.

Figure 2:
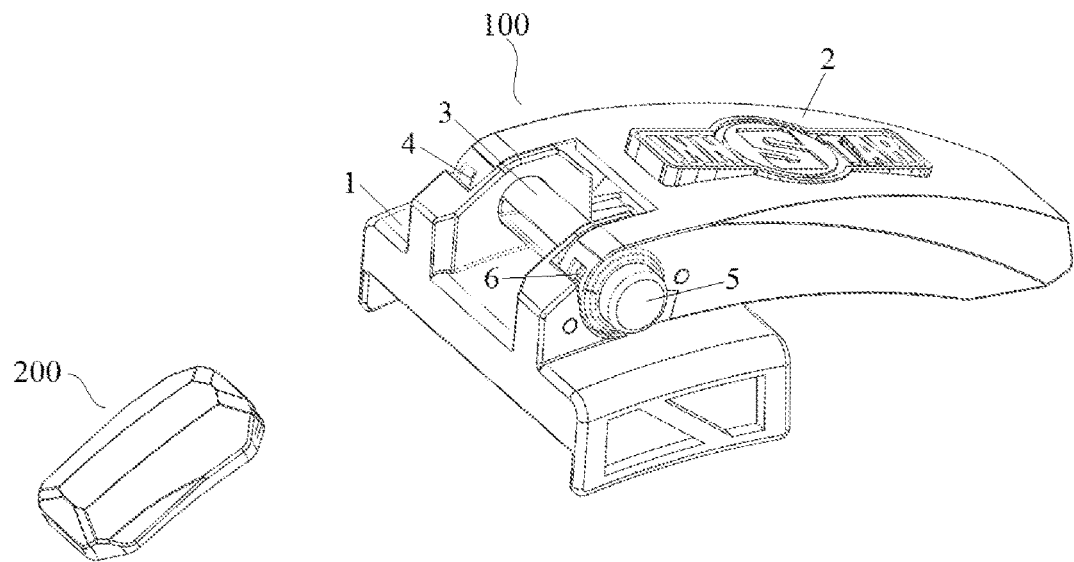
FIG. 2 is a schematic diagram of a three-dimensional structure of a belt buckle assembly of the belt according to the present invention.
Figure 3:
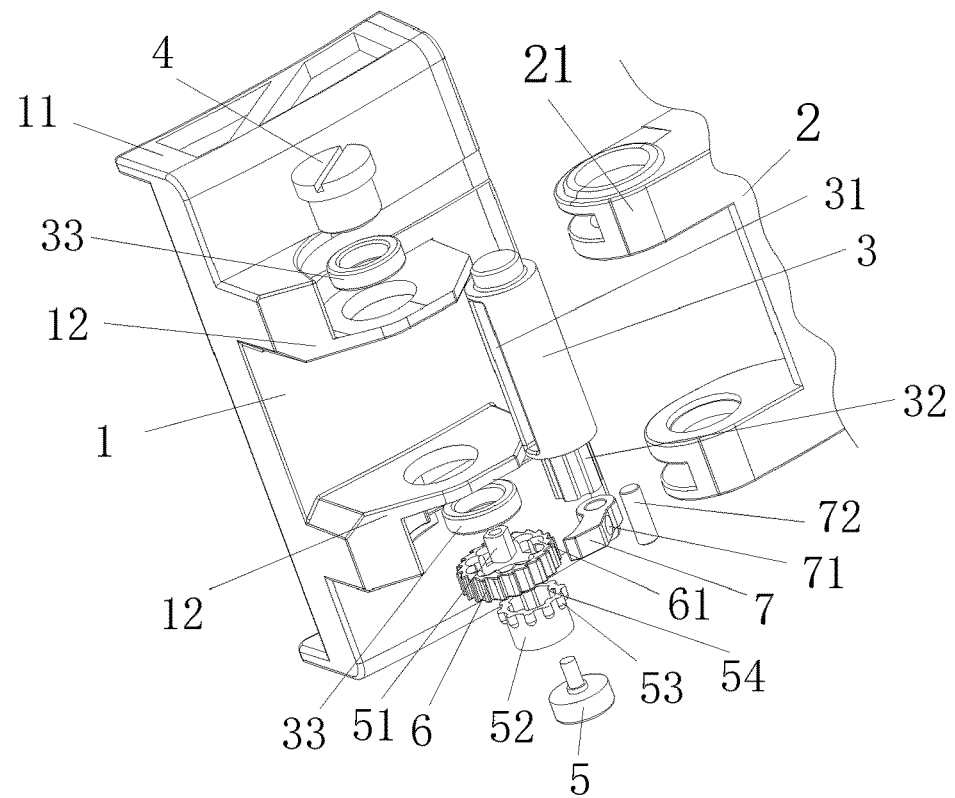
FIG. 3 is a schematic diagram of a split structure of a belt buckle assembly in Embodiment 1 according to the present invention.
Figure 4:
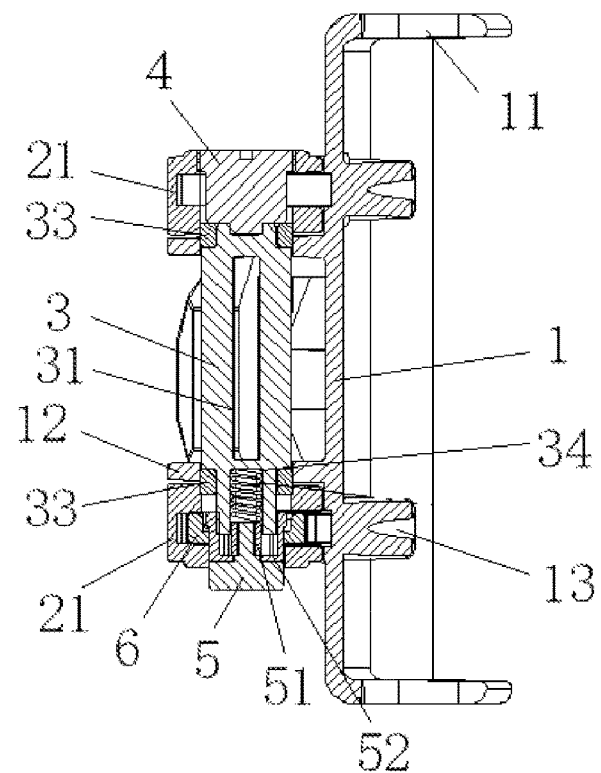
FIG. 4 is a schematic diagram of a cross-sectional structure of a belt in Embodiment 1 according to the present invention at a pin shaft member.

With reference to FIGS. 2 to 4, this embodiment further provides a belt buckle assembly, which comprises a belt buckle base plate 1 for fixedly connecting to the end part of the belt body 300, a pin shaft member 3, a ratchet wheel 6, a handle ratchet 7, a button assembly 5, and a swing handle housing 2, wherein a pair of handle lug plate housings 21 that rotatably fit at two ends of the pin shaft member 3 extend from an end part of the swing handle housing 2, a pair of base lug plate housings 12 extend from a front surface of the belt buckle base plate 1, the pin shaft member 3 is rotatably mounted in the base lug plate housing 12, and a belt body through hole 31 for an end part of the connection band 400 to pass through is formed in the pin shaft member 3. The belt buckle assembly further comprises a ratchet wheel unlocking mechanism. In this embodiment, the ratchet wheel unlocking mechanism uses a button assembly 5 comprising a limiting sleeve 52, a short shaft 32 extends from a lower end of the pin shaft member 3, the button assembly 5 is slidably and axially sleeved on the short shaft 32, a ratchet wheel 6 is movably sleeved on the button assembly 5, the ratchet wheel 6 is limited and arranged in the handle lug plate housing 21 below, a plurality of unlocking slots 61 are distributed in an inner side end face of the ratchet wheel 6, a plurality of convex parts 53 fitting the unlocking slots 61 are distributed in an inner side end face of the button assembly 5, a button spring groove 34 is formed in a lower end face of the short shaft 32, a button spring is arranged in the button spring groove 34, and a lower end of the button spring is connected against an upper end face of the button assembly 5. In this embodiment, the button assembly 5 is movably sleeved in the unlocking slot 61 of the ratchet wheel 6 through the limiting sleeve 52. The button spring will press against the button assembly 5, and the convex part 53 is engaged into the unlocking slot 61 of the ratchet wheel 6, such that the ratchet wheel 6, the button assembly 5 and the pin shaft member 3 cannot rotate clockwise.

This embodiment further defines a specific structure of the button assembly 5, the button assembly 5 comprises a button, a limiting sleeve 52 and a button nut 51, a button stud extends from an inner end of the button, the button stud movably passes through a center hole of an end face of the limiting sleeve 52 and is connected to the button nut 51 in a threaded fit manner, and the convex parts 53 are distributed on an outer circumferential wall of an upper end of the limiting sleeve 52.

The button nut 51 in this embodiment only axially limits the limiting sleeve 52, and does not lock the limiting sleeve 52. Apparently, the limiting sleeve 52 can rotate relative to the button, when the button is pressed by a finger, the connection band 400 is pulled, and since the limiting sleeve 52 can rotate relative to the button, the connection band 400 can be easily pulled with a small force; if the limiting sleeve 52 is locked by the button nut 51, when the connection band 400 is pulled, the friction between the pressed button and the finger needs to be overcome, and the connection band 400 is not convenient to be loosened.

The sleeve rib parts 54 are distributed and arranged on an inner wall of the limiting sleeve 52, and axial guide grooves fitting the sleeve rib parts 54 are distributed and arranged on an outer wall of a short shaft 32. The limiting sleeve 52 can only slide axially relative to the short shaft 32 under the fitting of the sleeve rib part 54 and the axial guide groove.

Apparently, in an alternative solution, the limiting sleeve 52 and the button in this embodiment may be made as an integrally formed component, and for facilitating the rotation of the limiting sleeve 52, a ball may be embedded on an outer end face of the button. When the disassembly is performed to loosen the connection band, the ball can be directly pressed.

The handle ratchet 7 is rotatably mounted in the handle lug plate housing 21 below through the handle ratchet shaft 72, a tooth end of the handle ratchet 7 is embedded in the ratchet wheel tooth groove of the ratchet wheel 6, a handle ratchet spring groove 71 is provided on an outer side wall of the handle ratchet 7, a handle ratchet spring (not shown in the figure) is arranged in the handle ratchet spring groove 71, and the other end of the handle ratchet spring is connected against an inner wall of the handle lug plate housing 21. The handle ratchet spring presses against the handle ratchet 7, so that the end part of the handle ratchet 7 is embedded into the ratchet wheel tooth groove of the ratchet wheel 6, and the clockwise rotation of the ratchet wheel 6 can be effectively limited. In this embodiment, each handle lug plate housing 21 is composed of two lug plates 211, the two lug plates 211 are fixed on the swing handle housing 2 and extend outward, a gap is provided between the two lug plates 211, and a size of the gap is equal to a width of handle ratchet 7. By reserving the gap between the two lug plates 211, the handle ratchet 7 can be engaged with the ratchet wheel 6 through the gap.

When an end part of the connection band 400 is inserted into the band body through hole 31, the swing handle housing 2 is pulled outward, and the handle ratchet 7 inside the swing handle housing 2 will push the ratchet wheel 6 to rotate counterclockwise; and since the unlocking slot 61 of the ratchet wheel 6 is engaged with the convex part 53 of the button assembly 5, the ratchet wheel 6 will rotate with the button assembly 5, and the button assembly 5 will drive the pin shaft member 3 to rotate counterclockwise, so that the connection band 400 is gradually wound around the pin shaft member 3.

The base side edge plates 11 for positioning side edges of the belt body 300 extend from upper and lower side edges of the belt buckle base plate 1. This structural design is reasonable and facilitates preliminary positioning of the end part of the belt body 300 when wearing the belt body 300, which is beneficial to subsequent operations.

The belt buckle assembly 100 in this embodiment has a relatively simple structural design, so that the assembly is more convenient, and the production and manufacturing efficiency is favorably improved; most parts are hidden inside, so that the overall appearance and shape are better; in addition, this structural design is more ergonomic and is more convenient to operate and adjust.

In a further solution, this embodiment further comprises a seat plate ratchet 8, the seat plate ratchet 8 is rotatably mounted in the base lug plate housing 12 below through a seat plate ratchet shaft 81, a tooth end of the seat plate ratchet 8 is also embedded into the ratchet wheel tooth groove of the ratchet wheel 6, an outer side wall of the seat plate ratchet 8 is provided with a seat plate ratchet spring groove, a seat plate ratchet spring is arranged in the seat plate ratchet spring groove, and the other end of the seat plate ratchet spring is connected against an inner wall of the base lug plate housing 12.

The seat plate ratchet 8 is provided to further limit the ratchet wheel 6, and when the handle lug plate housing 21 is pulled inward, the handle ratchet 7 jumps from one ratchet wheel tooth groove of the ratchet wheel 6 to the next ratchet wheel tooth groove, and if there is no further limitation of the seat plate ratchet 8, the friction between the handle ratchet 7 and the ratchet wheel 6 may cause the ratchet wheel 6 to rotate together, thereby possibly unwinding the wound connection band 400.

Two ends of the pin shaft member 3 are sleeved with shaft sleeves 33, and the handle lug plate housing 21 is connected to the shaft sleeve 33 in a rotating fit manner.

An upper end part of the pin shaft member 3 is connected to an end part pin 4 for limiting the handle lug plate housing 21 in a threaded fit manner. This structure design is reasonable and convenient for disassembly and assembly.

The working principle of this embodiment is as follows: when the belt is used, the belt body 300 is wrapped around the waist of a human body, a left end of the belt body 300 is inserted between the two base side edge plates 11, one hand is used to press the left end of the belt body 300 and the belt buckle base plate 1, the other hand is used to insert the end part of the connection band 400 into the band body through hole 31, then the swing handle housing 2 is pulled back and forth, the connection band 400 can be gradually wound by the pin shaft member 3, and along with the tightening of the connection band 400, the belt body 300 can be tightly bound on the waist of the human body.

When the connection band needs to be loosened, the button assembly 5 is pressed against an elastic force of the button spring, so that the convex part 53 of the button assembly 5 is disengaged from the unlocking slot 61 of the ratchet wheel 6. In this case, the button assembly 5 is no longer locked by the ratchet wheel 6, that is, the pin shaft member 3 can rotate freely; and then, the connection band 400 is pulled, the connection band 400 can be gradually unwound until the connection band 400 is completely disengaged from the pin shaft member 3, and the belt body 300 can be detached.

The belt buckle assembly 100 in this embodiment has a relatively simple structural design, so that the assembly is more convenient, and the production and manufacturing efficiency is favorably improved; most parts are hidden inside, so that the overall appearance and shape are better; in addition, this structural design is more ergonomic and is more convenient to operate and adjust.

Embodiment 2

Figure 5:
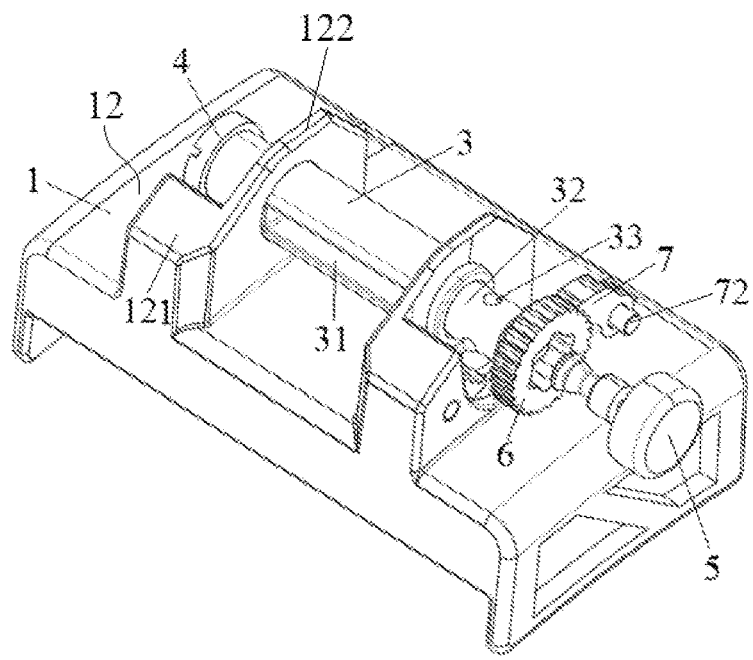
FIG. 5 is a schematic diagram of a split structure of a belt buckle assembly of a belt in Embodiment 2 according to the present invention.
Figure 6:
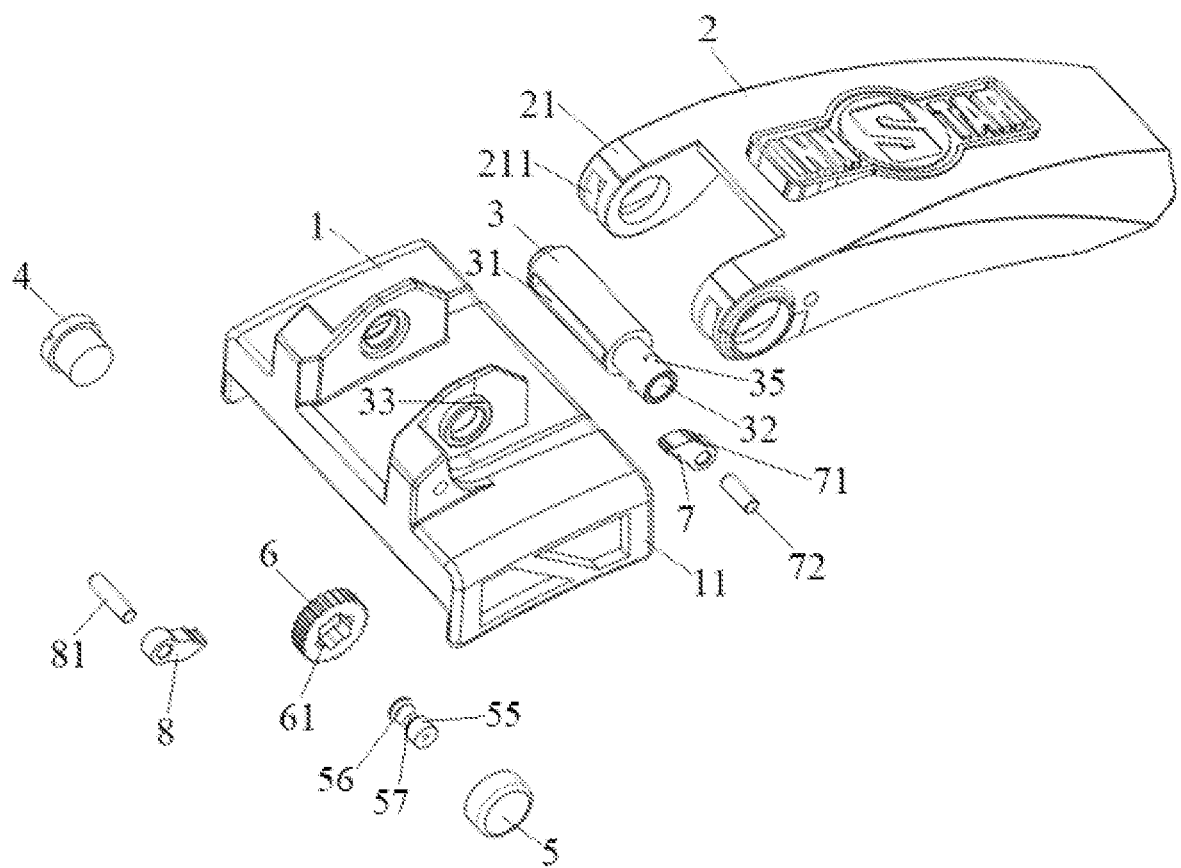
FIG. 6 is a schematic structural diagram of various components of a belt buckle assembly in the belt in Embodiment 2 according to the present invention after unfolding.
Figure 7:
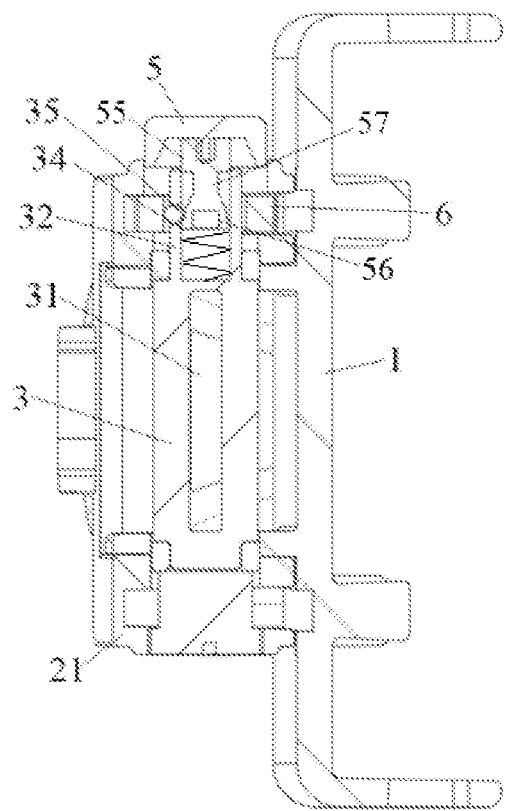
FIG. 7 is a schematic diagram of a cross-sectional structure of the belt in Embodiment 2 according to the present invention at a pin shaft member.

With reference to FIGS. 5 to 7, the belt buckle assembly of this embodiment has substantially the same structure as that of Embodiment 1, except that a ratchet wheel unlocking mechanism for the pin shaft member 3 and the ratchet wheel 6 of this embodiment is different from that of Embodiment 1. In this embodiment, the ratchet wheel unlocking mechanism uses an unlocking member 35, and the unlocking member 35 moves radially along the pin shaft member 3 to lock or unlock the pin shaft member 3 and the ratchet wheel 6.

The pin shaft member 3 is provided with a button hole along an axial direction, the button assembly 5 is mounted in the button hole, the button assembly 5 can drive to stretch and retract to complete the unlocking action, and an unlocking hole formed in a peripheral surface of the pin shaft member 3 is communicated with the button hole. Specifically, in this embodiment, a short shaft 32 with a certain length extends outward from one end of the pin shaft member 3, the short shaft 32 is hollow, and a cavity with a closed end and an open end is formed inside the short shaft, and the cavity is a button hole for mounting the button assembly 5. The unlocking member 35 is movably mounted on a side wall of the short shaft 32 (i.e., a side wall of the button hole), and in this embodiment, the unlocking member 35 is a ball, but is not limited to a ball, and may also be in other shapes such as a cylinder and a prism, and as long as an unlocking hole for the unlocking member 35 to move is formed on the side wall of the short shaft 32, the unlocking member 35 may be in any shape.

Figure 10:
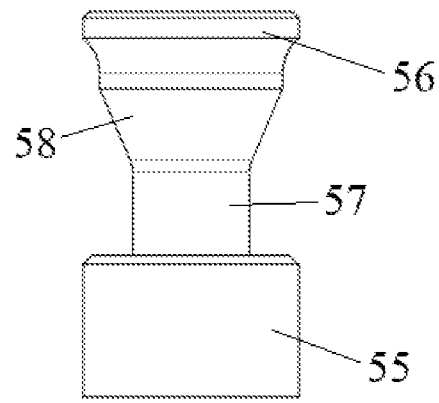
FIG. 10 is a schematic diagram of a structure of a button assembly of the belt in Embodiment 2 according to the present invention.

In this embodiment, the button assembly 5 comprises a locking part 56 and a releasing part 57 axially arranged in sections; the button assembly 5 axially moves along the button hole, and outer peripheral surfaces of the locking part 56 and the releasing part 57 of the button assembly can be separately in contact fit with the unlocking member 35; when the outer peripheral surface of the locking part 56 of the button assembly 5 is in contact fit with the unlocking member 35, the unlocking member 35 protrudes out of a surface of the unlocking hole of the pin shaft member 3, so that the ratchet wheel 6 is locked; and when the outer peripheral surface of the releasing part 57 of the button assembly 5 is in contact fit with the unlocking member 35, the unlocking member 35 is completely positioned in the unlocking hole of the pin shaft member 3, so that the ratchet wheel 6 is unlocked. Specifically, in this embodiment, a thickness of a side wall of the cavity is less than a length of the unlocking member 35 along a radial direction of an end face of the pin shaft member 3, i.e., in this embodiment, the thickness of the side wall of the cavity is less than a diameter of the ball. In this embodiment, the thickness of the side wall of the cavity is less than the diameter of the ball, so that when a part of the unlocking member 35 is embedded into the unlocking slot 61 of the ratchet wheel 6, another part of the unlocking member is always positioned in the side wall of the button hole, and the pin shaft member 3 and the ratchet wheel 6 can be firmly connected without relative rotation. Meanwhile, in this embodiment, the locking part 56 and the releasing part 57 are both cylinders and are integrally formed, a diameter of the locking part 56 is greater than that of the releasing part 57, and a transition arc-shaped surface 58 is arranged between the locking part 56 and the releasing part 57 (see FIG. 10). For a better function of the locking part 56, a circumferential surface of the locking part abuts against an inner wall of the cavity. In this embodiment, the locking part 56 is closer to the closed end of the cavity than the releasing part 57, and the button assembly 5 extends out of the pin shaft member 3 through the connecting part 55 and is fixedly connected to the button.

The elastic member is arranged between inner ends of the unlocking member 35 in the button hole of the pin shaft member 3. In this embodiment, the button assembly 5 is arranged in the cavity at an end part of the pin shaft member 3, a spring is arranged between the closed end of the cavity and the button assembly 5; when locking is needed, the spring ejects the button assembly 5 outwards, so that the locking part 56 abuts against the unlocking member 35, the unlocking member 35 is pushed out of the cavity and is embedded into an unlocking slot 61 on the ratchet wheel 6, and the pin shaft member 3 and the ratchet wheel 6 are fixed; and when the unblocking is needed, the spring contracts inward, so that the releasing part 57 is positioned at the unlocking member 35, the unlocking member 35 is retracted into the cavity, the pin shaft member 3 is disengaged from the ratchet wheel 6, and the locking and unlocking can be completed by simply pushing the button assembly 5, which is convenient to use. A button is arranged at an outer end of the button assembly 5 and protrudes out of the end face of the pin shaft member 3; and the outer peripheral surface of the locking part 56 of the button assembly 5 has an arc-shaped surface fitting a spherical surface of the unlocking member 35.

In order to prevent the unlocking member 35 from being partially positioned in the unlocking slot 61 under the action of gravity after unlocking, which causes that the pin shaft member 3 and the ratchet wheel 6 are still fixed together, in this embodiment, a maximum distance that the unlocking member 35 extends out of the unlocking hole is less than a radius of a sphere, and therefore when the pin shaft member 3 and the ratchet wheel 6 rotate relatively after unlocking, the unlocking member 35 can naturally retract into the unlocking hole.

In this embodiment, in order to more firmly lock the pin shaft member 3 and the ratchet wheel 6, a plurality of unlocking holes are arranged at intervals along the outer peripheral surface of the pin shaft member 3, and one unlocking member 35 is mounted in each unlocking hole; and the ratchet wheel 6 is provided with corresponding unlocking slots 61 corresponding to the unlocking holes, and a limiting protrusion is arranged between every two unlocking slots 61. Such an arrangement allows the unlocking member 35 to be engaged into the unlocking slot 61 after extending. The limiting protrusions on two sides of the unlocking slot 61 limit the movement of the unlocking member 35 to ensure the relative fixation between the ratchet wheel 6 and the pin shaft member 3.

Further, in this embodiment, a pair of base lug plate housings 12 extend outward from one side surface of the belt buckle base plate 1, and the base lug plate housings 12 are divided into a first portion and a second portion, wherein the first portion has a thickness that is greater than that of the second portion. Specifically, in this embodiment, the base lug plate housings 12 are respectively arranged close to two sides of the belt buckle base plate 1, and a space having a certain length is reserved in the middle, and the length of the space is set according to a length of the connection band 400, and is generally set to be equal to or slightly greater than the length of the connection band 400. The base lug plate housing 12 is in a shape of a "7", the first portion and the second portion are integrally formed, and the first portion has a thickness that is greater than that of the second portion. In this embodiment, the first portion is referred to as a pawl mounting seat 121, and the second portion is referred to as a thin wall portion 122, hereinafter the same below.

The pin shaft member 3 is rotatably mounted in the base lug plate housing 12, the pin shaft member 3 is mounted on the thin wall portion 122 of the base lug plate housing 12 through a shaft sleeve 33, and a length of the pin shaft member 3 is greater than an interval length between the two base lug plate housings 12. Two ends of the pin shaft member 3 extend outward through the thin wall portion 122, and one end is fixed by the end part pin 4 and the other end is a locking mechanism. In this embodiment, the end part pin 4 is a bolt. After tightening, the pin shaft member 3 is fixed. The pin shaft member 3 can rotate along the end part pin 4 as an axis.

Further, a band body through hole 31 for an end part of the connection band 400 to pass through is formed in the pin shaft member 3, and a length of the band body through hole 31 is the same as that of the connection band 400.

In this embodiment, the pin shaft member 3 is connected to the swing handle housing 2 through a belt locking mechanism. The belt locking mechanism extends out of the thin wall portion 122, and the connection band 400 is wound and locked through the fitting of the ratchet wheel 6 and the handle ratchet 7 with the belt locking mechanism.

Further, the seat plate ratchet 8 is provided inside the pawl mounting seat 121, and the seat plate ratchet 8 is rotatably mounted on the pawl mounting seat 121 by the seat plate ratchet shaft 81. The specific structure and mounting manner of the seat plate ratchet 8 are the same as those of the seat plate ratchet 8 in Embodiment 1.

Figure 8:
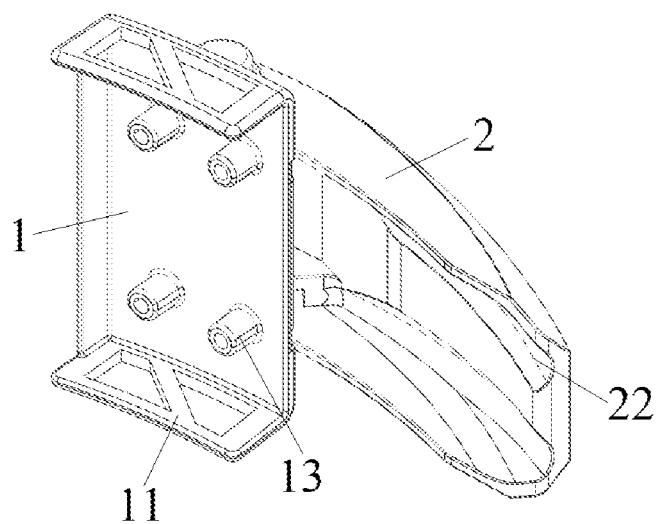
FIG. 8 is a schematic diagram of a three-dimensional structure of a back side of a belt buckle assembly in the belt according to the present invention.

In this embodiment, a base side edge plate 11 for positioning a side of the belt body 300 extends from a side edge of the belt buckle base plate 1, and the base side edge plate 11 is provided with a plurality of holes. In this embodiment, the base side edge plates 11 for positioning side edges of the belt body 300 extend from upper and lower side edges of the belt buckle base plate 1. This structural design is reasonable and facilitates preliminary positioning of the end part of the belt body 300 when wearing the belt body 300, which is beneficial to subsequent operations. One side that is of the belt buckle base plate 1 and that is far away from the swing handle housing 2 is provided with a plurality of seat plate rivet bosses 13 passing through the belt body 300, and rivets for pressing and fixing the belt body 300 are arranged on the seat plate rivet bosses 13 in a fitting manner. One side that is of the swing handle housing 2 and that is close to the belt body 300 is provided with a plurality of grooves 22, and a shape of the grooves 22 is adapted to a shape of human fingers, so as to facilitate the application of force by the fingers of a user (see FIG. 8).

The working principle of this embodiment is as follows: when the belt is used, the belt body 300 is wrapped around the waist of a human body, a left end of the belt body 300 is inserted between the two base side edge plates 11, one hand is used to press the left end of the belt body 300 and the belt buckle base plate 1, the other hand is used to insert the end part of the connection band 400 into the band body through hole 31, then the swing handle housing 2 is pulled back and forth, the connection band 400 can be gradually wound by the pin shaft member 3, and along with the tightening of the connection band 400, the belt body 300 can be tightly bound on the waist of the human body.

When the belt needs to be loosened, an elastic force of the elastic member is overcome, and the button assembly 5 is pressed, causing the locking part 56 of the button assembly 5 to leave the unlocking member 35, the releasing part 57 is displaced to the unlocking member 35, and the unlocking member 35 can be retracted into the cavity; in this case, the pin shaft member 3 is no longer locked by the ratchet wheel 6, that is, the pin shaft member 3 can rotate freely; and then, the connection band 400 is pulled, the connection band 400 can be gradually unwound until the connection band 400 is completely disengaged from the pin shaft member 3, and the belt body 300 can be detached.

The present invention and embodiments thereof have been described above schematically, and the description is not intended to be limiting, and what is shown in the drawings is only one of the embodiments of the present invention, and the actual structure is not limited thereto. Therefore, similar structural forms and embodiments to the technical solution, which are designed according to inspiration of the accompanying drawings by those of ordinary skill in the art, without departing from the spirits of the present invention and without creative efforts, shall fall within the protection scope of the present invention.

The invention claimed is:

1. A belt buckle assembly, comprising: a belt buckle base plate (1), a pin shaft member (3), a ratchet wheel (6) and a handle ratchet (7) which fit each other, and a swing handle housing (2), wherein the swing handle housing (2) is rotatably mounted on the belt buckle base plate (1) by the pin shaft member (3), the handle ratchet (7) is rotatably supported and mounted on the swing handle housing (2), the ratchet wheel (6) is provided with a center hole and sleeved on the pin shaft member (3) through the center hole, and the ratchet wheel (6) is provided with an unlocking slot (61); and a ratchet wheel unlocking mechanism; wherein the ratchet wheel unlocking mechanism comprises an unlocking member (35), and the unlocking member (35) can move radially along the pin shaft member (3) so as to be engaged into or disengaged from the unlocking slot (61);

the structure of the ratchet wheel unlocking mechanism is arranged such that when the unlocking member (35) is engaged into the unlocking slot (61) of the ratchet wheel (6), the pin shaft member (3) can rotate together with the ratchet wheel (6), and when the unlocking assembly is disengaged from the unlocking slot (61) of the ratchet wheel (6), the pin shaft member (3) can rotate individually.

2. The belt buckle assembly according to claim 1, wherein the unlocking member (35) is mounted in an unlocking hole formed in a peripheral surface of the pin shaft member (3) and radially moves in the unlocking hole.

3. The belt buckle assembly according to claim 2, wherein the ratchet wheel unlocking mechanism further comprises a button assembly (5); the pin shaft member (3) is provided with a button hole along an axial direction, and the unlocking hole formed on the peripheral surface of the pin shaft member (3) is communicated with the button hole; and the button assembly (5) is arranged in the button hole and can drive the unlocking member (35) to protrude and retract to complete an unlocking action.

4. The belt buckle assembly according to claim 3, wherein the button assembly (5) comprises a locking part (56) and a releasing part (57) axially arranged in sections; the button assembly (5) axially moves along the button hole, and outer peripheral surfaces of the locking part (56) and the releasing part (57) of the button assembly can be separately in contact fit with the unlocking member (35); when the outer peripheral surface of the locking part (56) of the button assembly (5) is in contact fit with the unlocking part (35), the unlocking part (35) protrudes out of a surface of the unlocking hole of the pin shaft part (3), so that the ratchet wheel (6) is locked to the pin shaft member (3); and when the outer peripheral surface of the releasing part (57) of the button assembly (5) is in contact fit with the unlocking member (35), the unlocking member (35) is completely positioned in the unlocking hole of the pin shaft member (3), so that the ratchet wheel (6) is unlocked from the pin shaft member (3).

5. The belt buckle assembly according to claim 4, wherein a button is mounted at an outer end of the button assembly (5), and the button protrudes out of an end face of the pin shaft member (3).

6. The belt buckle assembly according to claim 5, wherein an elastic member that presses an inner end of the button assembly (5) is arranged in the button hole of the pin shaft member (3).

7. The belt buckle assembly according to claim 4, wherein the unlocking member (35) has a spherical shape.

8. The belt buckle assembly according to claim 7, wherein the outer peripheral surface of the locking part (56) of the button assembly (5) has an arc-shaped surface matched with a spherical surface of the unlocking member (35).

9. The belt buckle assembly according to claim 7, wherein a maximum distance that the unlocking member (35) extends out of the unlocking hole is less than a radius of the spherical unlocking member.

10. The belt buckle assembly according to claim 9, wherein the pin shaft member (3) is provided with a plurality of unlocking holes at intervals along an outer peripheral surface, one unlocking member (35) is mounted in each unlocking hole, and the ratchet wheel (6) is provided with an unlocking slot (61) corresponding to the unlocking hole.

11. The belt buckle assembly according to claim 1, wherein a pair of handle lug plate housings (21) that rotatably fit at two ends of the pin shaft member (3) extend from an end part of the swing handle housing (2), a pair of base lug plate housings (12) extend from a front surface of the belt buckle base plate (1), and the pin shaft member (3) is rotatably mounted in the base lug plate housing (12) through a shaft sleeve (33).

12. The belt buckle assembly according to claim 11, wherein a tooth end of the handle ratchet (7) is embedded into a ratchet wheel tooth groove of the ratchet wheel (6), one side that is of the handle ratchet and that is far away from the ratchet wheel (6) is provided with a handle ratchet spring groove (71), a first end and a second end of a handle ratchet spring abut against the handle ratchet spring groove (71) and an inner wall of the handle lug plate housing (21) respectively, and the handle ratchet spring is rotatably mounted in the handle lug plate housing (21) by a handle ratchet shaft (72).

13. The belt buckle assembly according to claim 12, further comprising a seat plate ratchet (8), wherein the seat plate ratchet (8) is rotatably mounted in the base lug plate housing (12) below by a seat plate ratchet shaft (81).

14. The belt buckle assembly according to claim 13, wherein a tooth end of the seat plate ratchet (8) is also embedded into another ratchet wheel tooth groove of the ratchet wheel (6), an outer side wall of the seat plate ratchet (8) is provided with a seat plate ratchet spring groove, a seat plate ratchet spring is arranged in the seat plate ratchet spring groove, and the other end of the seat plate ratchet spring is connected against an inner wall of the base lug plate housing (12).

15. A weightlifting belt, comprising the belt buckle assembly for winding a connection band (400) according to claim 1, a belt body (300), a connection band mounting seat (200) and the connection band (400), wherein the belt buckle assembly (100) is fixed at an end part of the belt body (300), the connection band mounting seat (200) is fixed at the other end of the belt body (300), and the connection band (400) is fixedly connected to the connection band mounting seat (200).

16. The weightlifting belt according to claim 15, wherein a band seat groove cavity (201) is arranged at a back side of the connection band mounting seat (200), a plurality of band seat rivet bosses (202) for passing through the belt body (300) are distributed and extended in the band seat groove cavity (201), rivets for pressing and fixing the belt body (300) are also mounted on the band seat rivet bosses (202) in a fitting manner, a band body through slot (203) communicated with the band seat groove cavity (201) is further provided at a side end of the connection band mounting seat (200), and an end part of the connection band (400) passes through and is fixed in the band body through slot (203).

* * * * *